United States Patent
Roberts et al.

(10) Patent No.: US 10,510,194 B2
(45) Date of Patent: Dec. 17, 2019

(54) CLOUD-BASED CONNECTIVITY ENERGY BUDGET MANAGER

(71) Applicant: FORD GLOBAL TECHNOLOGIES, LLC, Dearborn, MI (US)

(72) Inventors: David Randolph Roberts, Dearborn, MI (US); Robert Stanko, Warren, MI (US); Mark Anthony Rockwell, Wyandotte, MI (US); Benjamin M. Rocci, Plymouth, MI (US); Christian Krozal, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 207 days.

(21) Appl. No.: 15/620,139

(22) Filed: Jun. 12, 2017

(65) Prior Publication Data
US 2018/0357838 A1 Dec. 13, 2018

(51) Int. Cl.
*G07C 5/00* (2006.01)
*G07C 5/08* (2006.01)
*H04L 29/08* (2006.01)

(52) U.S. Cl.
CPC ........... *G07C 5/008* (2013.01); *G07C 5/0808* (2013.01); *G07C 5/0841* (2013.01); *H04L 67/12* (2013.01)

(58) Field of Classification Search
CPC .... G07C 5/008; G07C 5/0808; G07C 5/0841; H04L 67/12
See application file for complete search history.

(56) References Cited

U.S. PATENT DOCUMENTS

| | | | |
|---|---|---|---|
| 2005/0060070 A1* | 3/2005 | Kapolka | G06Q 10/08 701/31.4 |
| 2005/0203683 A1* | 9/2005 | Olsen | B60R 25/1004 701/29.3 |
| 2014/0228061 A1* | 8/2014 | Draznin | H04W 4/70 455/466 |
| 2015/0094903 A1 | 4/2015 | Bell | |
| 2016/0055684 A1 | 2/2016 | Chen | |
| 2016/0071333 A1* | 3/2016 | Haidar | G07C 5/006 701/29.3 |
| 2016/0343177 A1* | 11/2016 | McQuade | G07C 5/008 |
| 2017/0091634 A1* | 3/2017 | Ritter | G06N 5/045 |
| 2017/0092018 A1* | 3/2017 | Throop | G07C 5/008 |

* cited by examiner

*Primary Examiner* — Behrang Badii
*Assistant Examiner* — Daniel L Greene
(74) *Attorney, Agent, or Firm* — Michael J. Spenner; Brooks Kushman P.C.

(57) ABSTRACT

A storage maintains energy estimates corresponding to function requests for vehicles. A processor of a server is programmed to receive a function request for a vehicle, and direct the vehicle to perform the function request responsive to determining, according to battery information received from the vehicle and an energy estimate corresponding to the function request, that the vehicle has sufficient energy to perform the function request.

16 Claims, 2 Drawing Sheets

CLOUD-BASED CONNECTIVITY ENERGY BUDGET MANAGER

TECHNICAL FIELD

Aspects of the disclosure generally relate to a cloud-based energy budget manager for connectivity functions.

BACKGROUND

Automobile diagnostic data, such as Diagnostic Trouble Codes (DTCs), form compact, informative messages. Diagnostic data was designed to allow vehicle controllers to indicate a system fault and/or a need for repair. Although the DTC is in 'Active' or 'Confirmed' status for the key cycle in which the fault occurred, most DTCs then revert to a 'History' or 'Aging' status for a number of key cycles so that evidence of the fault will still be available, even if the vehicle is inspected by a technician weeks after the fault.

SUMMARY

In one or more illustrative embodiments, a system includes a storage configured to maintain diagnostic data, cadence trigger criteria defining a periodic transmission of the diagnostic data, and priority trigger criteria defining out-of-cadence transmission of the diagnostic data; and a processor programmed to periodically send diagnostic data accumulated since a previous cadence transmission to a remote server per the cadence trigger criteria, and send, out-of-cadence diagnostic data meeting the priority trigger criteria to the server to the remote server.

In one or more illustrative embodiments, a method includes storing, to a telematics controller, diagnostic trouble code (DTC) data received from other controllers via a vehicle bus; sending, from the telematics controller, DTC data meeting priority trigger criteria to the remote server; deleting the DTC data sent per the priority trigger criteria; periodically sending, from the controller, all stored DTC data to a remote server per cadence trigger criteria; and deleting the DTC data sent per the cadence trigger criteria.

In one or more illustrative embodiments, a non-transitory computer-readable medium includes instructions that, when executed by a processor of a telematics controller, cause the telematics controller to store diagnostic trouble code (DTC) data received from other controllers via a vehicle bus; send, from the telematics controller, DTC data meeting priority trigger criteria to the remote server; delete the DTC data sent per the priority trigger criteria; periodically send, from the controller, all stored DTC data to a remote server per cadence trigger criteria; and delete the DTC data sent per the cadence trigger criteria.

DETAILED DESCRIPTION

Figure 1:
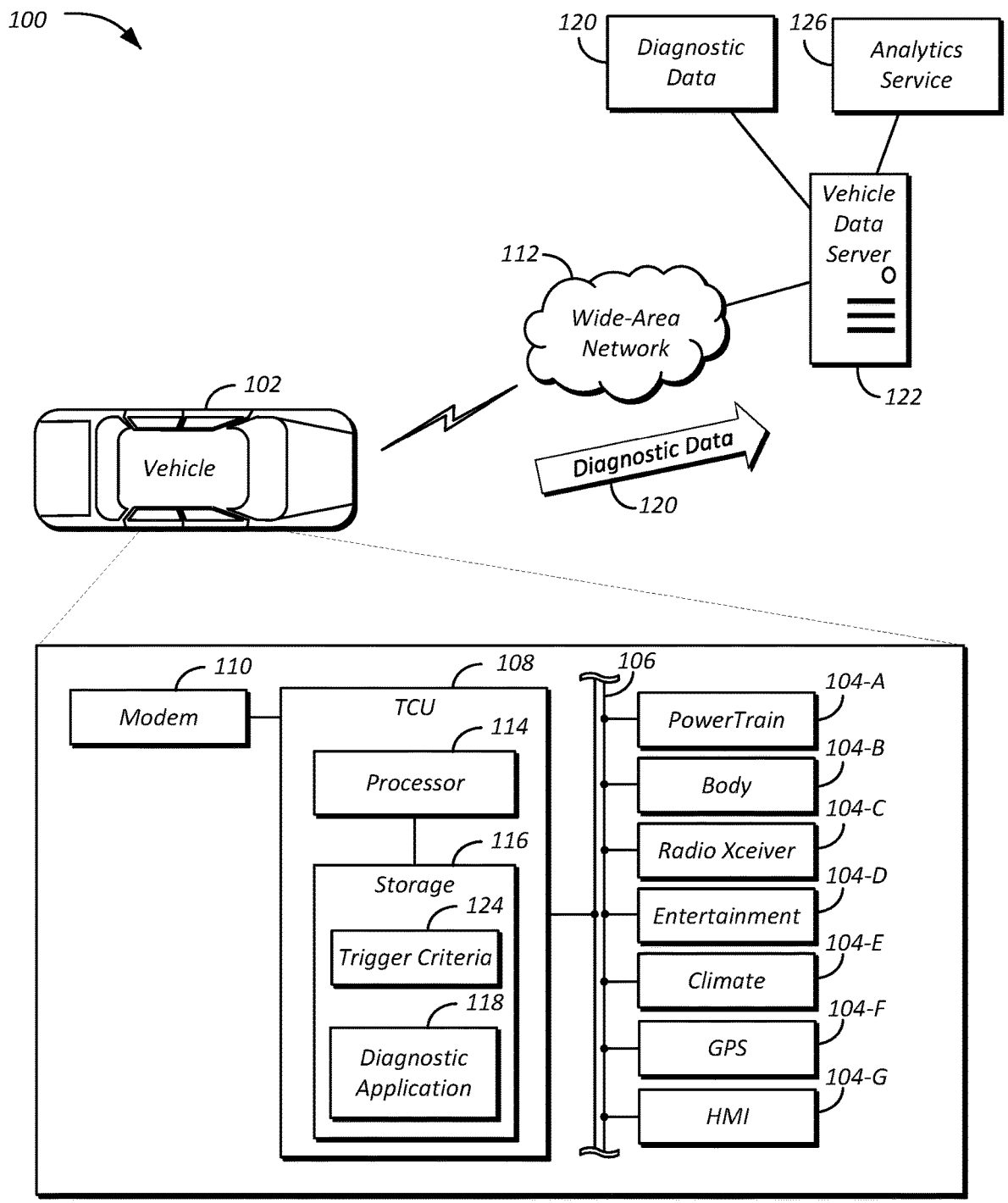
FIG. 1 illustrates an example system implementing efficient connected vehicle diagnostic data monitoring.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The DTC standard was created prior to the ubiquity of connected vehicles. Now, with connected vehicles, DTC data can be collected and transmitted every key cycle, or even multiple times per key cycle. This capability creates opportunity and challenge. If OEMs or 3rd party connectivity providers design their systems to collect and send DTCs every key cycle, the amount of data being collected may become overwhelming in size and repetition. Alternatively, if the connectivity system is designed to collect only 'Active'/'Confirmed' DTCs, then important information may be lost (e.g., History DTCs). Thus, some benefits of ubiquitous connectivity may be lost since the 'noise' in the data from high frequency collection of 'Historical' DTCs can reduce effectiveness of an early warning/quality signal provided by the less frequent 'Active'/'Confirmed' DTC occurrences.

An efficient connected vehicle diagnostic data monitoring system may be utilized to address issues with too much or too little data being collected via a hybrid approach. The approach institutes regular collection of DTC data with in-vehicle logic to efficiently send data under two scenarios. In a first scenario, e.g., a time scenario, a regular cadence of DTC transmission is defined based on time or number of key cycles. In an example, a time scenario could include data transmission every predefined period (e.g., 30 days, 40 key cycles, etc.), regardless of the status of the DTCs collected. In a second scenario, e.g., a trigger scenario, one or more triggers may be defined for the transmission of data according to DTF status. In an example, the trigger scenario may include logic that triggers DTC transmission to be send to a remote server responsive to collection of an 'Active' or 'Confirmed' DTC. This may also allow for other DTC status triggers to be established, such as transmission of DTC data if a DTC in 'Pending' status is collected.

The two scenarios, working in tandem, accomplish two goals. First, regular transmissions are needed to get a regular heartbeat of data for analytics purposes, and to monitor the progression of DTCs in 'History'/'Aging' status. Second, data transmissions triggered by DTC status such as 'Active'/'Confirmed' allow for the system to be aware of all 'Active' DTCs in the key cycle where the fault was confirmed.

Because the 'Active' DTCs are relatively rare, and are the most important DTC information to transmit from a connected vehicle, this dual approach thins the data to only the most valuable diagnostic information. In addition, by providing less frequent regular DTC data collection of 'History' DTCs, this reduces the data transmitted from connected vehicles. Further aspects of the disclosure are discussed in further detail below.

FIG. 1 illustrates an example system 100 implementing efficient connected vehicle diagnostic data monitoring. As illustrated, the vehicle 102 includes a plurality of vehicle controllers 104 in communication over one or more vehicle buses 106. The system 100 also includes a vehicle data server 122 configured to maintain diagnostic data 120 received from various vehicles 102. The vehicle 102 further includes a telematics control unit (TCU) 108 configured to send diagnostic data 120 including diagnostic information to the vehicle data server 122. The TCU 108 may utilize a diagnostic application 118 installed to the TCU 108 to send a regular cadence of diagnostic data 120 as well as to send triggered diagnostic data 120 responsive to trigger criteria 124 having been met. It should be noted that the system 100 is merely an example, and other arrangements or combinations of elements may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as VINs.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104-A through 104-G. However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors and/or trunk of the vehicle 102); a radio transceiver controller 104-C may be configured to communicate with key fobs, mobile devices, or other local vehicle 102 devices; an entertainment controller 104-D may be configured to support voice command and BLUETOOTH interfaces with the driver and driver carry-on devices; a climate control management controller 104-E may be configured to provide control of heating and cooling system components (e.g., compressor clutch, blower fan, temperature sensors, etc.); a global positioning system (GPS) controller 104-F may be configured to provide vehicle location information; and a human-machine interface (HMI) controller 104-G may be configured to receive user input via various buttons or other controls, as well as provide vehicle status information to a driver, such as fuel level information, engine operating temperature information, and current location of the vehicle 102.

The vehicle bus 106 may include various methods of communication available between the vehicle ECUs 104, as well as between the TCU 108 and the vehicle ECUs 104. As some non-limiting examples, the vehicle bus 106 may include one or more of a vehicle controller area network (CAN), an Ethernet network, and a media oriented system transfer (MOST) network. Further aspects of the layout and number of vehicle buses 106 are discussed in further detail below.

The TCU 108 may include network hardware configured to facilitate communication between the vehicle ECUs 104 and with other devices of the system 100. For example, the TCU 108 may include or otherwise access a cellular modem 110 configured to facilitate communication with the wide-area network 112. The wide-area network 112 may include one or more interconnected communication networks such as the Internet, a cable television distribution network, a satellite link network, a local area network, a wide area network, and a telephone network, as some non-limiting examples. As another example, the TCU 108 may utilize one or more of BLUETOOTH, Wi-Fi, and wired USB network connectivity to facilitate communication with the wide-area network 112 via the user's mobile device.

The TCU 108 may further include various types of computing apparatus in support of performance of the functions of the TCU 108 described herein. In an example, the TCU 108 may include one or more processors 114 configured to execute computer instructions, and a storage 116 medium on which the computer-executable instructions and/or data may be maintained. A computer-readable storage medium (also referred to as a processor-readable medium or storage 116) includes any non-transitory (e.g., tangible) medium that participates in providing data (e.g., instructions) that may be read by a computer (e.g., by the processor(s)). In general, a processor 114 receives instructions and/or data, e.g., from the storage 116, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, PL/SQL, etc.

The TCU 108 may be configured to include one or more interfaces from which vehicle information may be sent and received. In an example, the TCU 108 may be configured to facilitate the collection of DTC data and/or other vehicle information from the vehicle ECUs 104 connected to the one or more vehicles buses 106. This collected information may be referred to as diagnostic data 120. The TCU 108 may store the collected diagnostic data 120 to the storage 116 of the TCU 108, or in other examples to other storage in communication with the TCU 108. The vehicle information retrieved by the TCU 108 may include, as some non-limiting examples, accelerator pedal position, steering wheel angle, vehicle speed, vehicle location (e.g., GPS coordinates, etc.), vehicle unique identifier (e.g., VIN), engine revolutions per minute (RPM), and vehicle HMI information, such as steering wheel button press information. Thus, diagnostic data 120 may include collected DTC information and/or other vehicle information stored to the storage 116 of the TCU 108.

The diagnostic application 118 may be one application included on the storage 116 of the TCU 108. The diagnostic application 118 may include instructions that, when executed by the processor 114 of the TCU 108, cause the TCU 108 to periodically collect the diagnostic data 120 information from the controllers 104 (e.g., including DTC information), store the information for transmission, and transmit the diagnostic data 120 to the vehicle data server 122 over the wide-area network 112.

The vehicle data server 122 may include various types of computing apparatus, such as a computer workstation, a server, a desktop computer, a virtual server instance executed by a mainframe server, or some other computing system and/or device. Similar to the TCU 108, the vehicle data server 122 generally includes a memory on which computer-executable instructions may be maintained, where the instructions may be executable by one or more processors (not shown for clarity). Such instructions and other data may be stored using a variety of computer-readable media. In an example, the vehicle data server 122 may be configured to maintain the diagnostic data 120 received from the TCU 108 of the vehicles 102 by way of the network 112.

The diagnostic application 118 may also include instructions for performing functions in response to trigger criteria 124. The trigger criteria 124 may include one or more conditions that, when met, cause at least a subset of the diagnostic data 120 to be transmitted. The trigger criteria 124 may also include information indicative of what collected diagnostic data 120 should be transmitted to the vehicle data server 122 based on satisfaction of the condition(s) of the trigger criteria 124.

The trigger criteria 124 may include cadence trigger criteria 124. The cadence trigger criteria 124 may include conditions that cause the bulk of collected diagnostic data 120 to be transmitted. The cadence trigger criteria 124 may include a time scenario wherein a data transmission is determined to be made every predefined period of time (e.g., 30 days.) Additionally or alternatively, the cadence trigger criteria 124 may include a time scenario wherein a data transmission is determined to be made after occurrence of predefined count of a specific event (e.g., 40 key cycles).

The trigger criteria 124 may also include priority trigger criteria 124. The priority trigger criteria 124 may include conditions that cause the data triggering the condition to be transmitted. For instance, one or more triggers of the trigger criteria 124 may be defined for the transmission of data according to DTC status. As one possibility, the trigger criteria 124 may include a transmission trigger responsive to collection of an 'Active' or 'Confirmed' DTC. As another possibility, the trigger criteria 124 may include a transmission trigger responsive to other DTC statuses, such as transmission of DTC data if a DTC in 'Pending' status is collected.

The vehicle data server 122 may be further configured to maintain an analytics service 126 configured to analyze the maintained diagnostic data 120 provided from the vehicles 102. The analytics service 126 may include instructions that, when executed by a processor of the vehicle data server 122, cause the vehicle data server 122 to review the diagnostic data 120, and provide statistics regarding common DTCs or other conditions.

Variations on the system 100 are possible. In an example, instead of, or in addition to, use of the TCU 108 to provide remote connectivity to the vehicle data server 122, the TCU 108 may utilize communications features of a modem of a user's mobile device paired with the entertainment controller 104-D to perform communication over the wide-area network 112.

Figure 2:
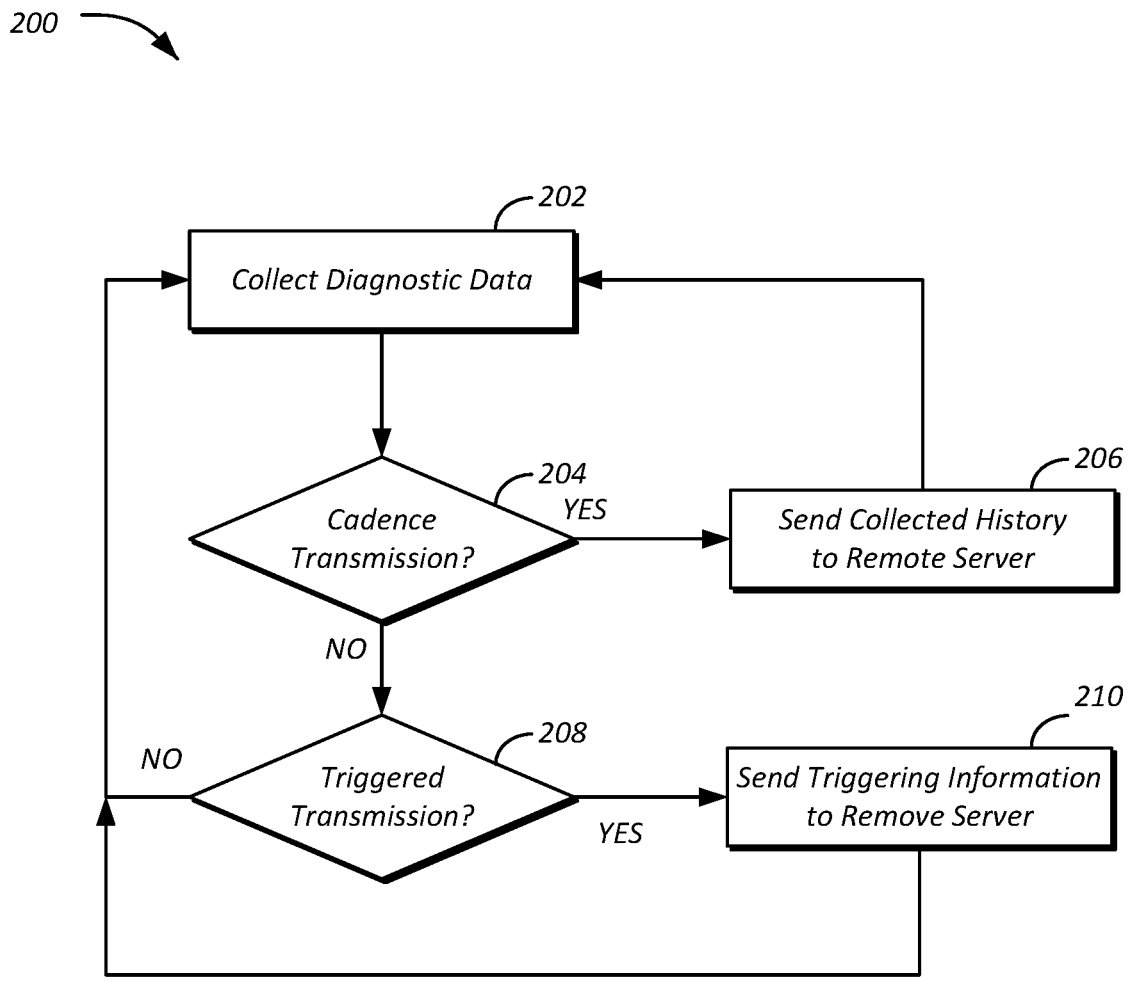
FIG. 2 illustrates an example process for efficient connected vehicle diagnostic data monitoring.

FIG. 2 illustrates an example process 200 for efficient connected vehicle diagnostic data monitoring. In an example, the process 200 may be performed by the diagnostic application 118 executed by the TCU 108.

At operation 202, the TCU 108 collects diagnostic data 120. In an example, the TCU 108 collects DTC data and/or other vehicle information from the vehicle ECUs 104 connected to the one or more vehicles buses 106. In another example, TCU 108 collects other vehicle information traversing the one or more vehicles buses 106.

At 204, the TCU 108 determines whether a cadence transmission is due. In an example, the TCU 108 may determine whether cadence trigger criteria 124 have been met. The cadence trigger criteria 124 may include a time scenario wherein a data transmission is determined to be made every predefined period of time (e.g., 30 days.) Additionally or alternatively, the cadence trigger criteria 124 may include a time scenario wherein a data transmission is determined to be made after occurrence of a predefined count of a specific event (e.g., 40 key cycles). If the cadence trigger criteria 124 have been met, control passes to operation 206. Otherwise, control returns to operation 202.

At 206, the TCU 108 sends the collected history of diagnostic data 120. In an example, the TCU 108 sends the collected diagnostic data 120 to the vehicle data server 122 regardless of the status of the DTCs collected. For instance, the diagnostic data 120 may include DTCs that are 'Active'/'Confirmed' DTCs as well as 'Historical' DTCs. After operation 206, control passes to operation 208.

At 208, the TCU 108 determines whether a triggered transmission is required. In an example, the TCU 108 may determine whether priority trigger criteria 124 have been met. For instance, one or more triggers of the trigger criteria 124 may be defined for the transmission of data according to DTC status. As one possibility, the trigger criteria 124 may include a transmission trigger responsive to collection of an 'Active' or 'Confirmed' DTC. As another possibility, the trigger criteria 124 may include a transmission trigger responsive to other DTC statuses, such as transmission of DTC data if a DTC in 'Pending' status is collected. If the priority trigger criteria 124 have been met, control passes to operation 210. Otherwise, control returns to operation 202.

At 210, the TCU 108 sends the information that triggered the transmission. In an example, the TCU 108 sends the one or more DTCs that triggered at operation 208 for transmission to the vehicle data server 122. In other examples, the TCU 108 may additionally or alternatively send further information to the vehicle data server 122. For instance, the TCU 108 may further send additional stored diagnostic data 120 to the vehicle data server 122 collected since the previous cadence transmission. After operation 210, control returns to operation 202.

Computing devices described herein, such as the controllers 104, TCU 108, and vehicle data server 122, generally include computer-executable instructions where the instructions may be executable by one or more computing devices such as those listed above. Computer-executable instructions, such as those of the diagnostic application 118, may be compiled or interpreted from computer programs created using a variety of programming languages and/or technologies, including, without limitation, and either alone or in combination, Java™, C, C++, C#, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a storage, onboard a vehicle, configured to maintain diagnostic data, cadence trigger criteria defining a periodic transmission of the diagnostic data, and priority trigger criteria defining out-of-cadence transmission of the diagnostic data; and
   a processor, onboard the vehicle, programmed to
   periodically send diagnostic data accumulated since a previous cadence transmission to a remote server per the cadence trigger criteria,
   send out-of-cadence diagnostic data meeting the priority trigger criteria to the remote server, and
   delete the out-of-cadence diagnostic data from the storage responsive to the send of the out-of-cadence diagnostic data to avoid resending the out-of-cadence diagnostic data in a next cadence transmission.

2. The system of claim 1 wherein the processor is further programmed to delete the diagnostic data accumulated since a previous cadence responsive to the send of the diagnostic data in a periodic transmission.

3. The system of claim 1 wherein the cadence trigger criteria specify to periodically send the diagnostic data upon completion of a predefined number of vehicle key cycles.

4. The system of claim 1 wherein the cadence trigger criteria specify to periodically send the diagnostic data upon passage of a predefined number of days.

5. The system of claim 1 wherein the priority trigger criteria specify to send diagnostic data from the storage indicative of 'Active' diagnostic codes as the out-of-cadence diagnostic data.

6. The system of claim 1 wherein the priority trigger criteria specify to send diagnostic data from the storage indicative of 'Pending' diagnostic codes as the out-of-cadence diagnostic data.

7. A method comprising:
   storing, to a telematics controller, diagnostic trouble code (DTC) data received from other controllers via a vehicle bus;
   sending, from the telematics controller, priority DTC data from the store DTC data meeting priority trigger criteria to a remote server;
   deleting the priority DTC data sent per the priority trigger criteria from the stored DTC data, responsive to the sending of the priority DTC data from the telematics controller, to avoid resending the priority DTC data in a transmission per cadence trigger criteria;
   periodically sending, from the controller, all stored DTC data to the remote server per the cadence trigger criteria; and
   deleting the stored DTC data sent per the cadence trigger criteria responsive to the sending of the stored DTC data from the telematics controller.

8. The method of claim 7 further comprising setting the cadence trigger criteria to periodically send the diagnostic data upon completion of a predefined number of vehicle key cycles.

9. The method of claim 7 further comprising setting the cadence trigger criteria to periodically send the diagnostic data upon passage of a predefined number of days.

10. The method of claim 7 further comprising setting the priority trigger criteria to send the diagnostic data indicative of 'Active' DTCs.

11. The method of claim 7 further comprising setting the priority trigger criteria to send the diagnostic data indicative of 'Pending' DTCs.

12. A non-transitory computer-readable medium comprising instructions that, when executed by a processor of a telematics controller, cause the telematics controller to:
   store diagnostic trouble code (DTC) data received from other controllers via a vehicle bus;
   send, from the telematics controller, priority DTC data from the stored DTC data meeting priority trigger criteria to a remote server;
   delete the priority DTC data sent per the priority trigger criteria from the stored DTC data, responsive to the send of the priority DTC data from the telematics controller, to avoid resending the DTC diagnostic data in a transmission per cadence trigger criteria;

periodically send, from the controller, all stored DTC data to a remote server per cadence trigger criteria; and delete the stored DTC data sent per the cadence trigger criteria responsive to the send of the stored DTC data from the telematics controller.

13. The medium of claim 12 further comprising instructions to cause the telematics controller to set the cadence trigger criteria to periodically send the diagnostic data upon completion of a predefined number of vehicle key cycles.

14. The medium of claim 12 further comprising instructions to cause the telematics controller to set the cadence trigger criteria to periodically send the diagnostic data upon passage of a predefined number of days.

15. The medium of claim 12 further comprising instructions to cause the telematics controller to set the priority trigger criteria to send the diagnostic data indicative of 'Active' DTCs.

16. The medium of claim 12 further comprising instructions to cause the telematics controller to set the priority trigger criteria to send the diagnostic data indicative of 'Pending' DTCs.

* * * * *